US012635736B2

(12) United States Patent　　(10) Patent No.: US 12,635,736 B2
Pilatowicz　　(45) Date of Patent: May 26, 2026

(54) AEROSOL GENERATION DEVICE POWER SYSTEM

(71) Applicant: JT International SA, Geneva (CH)

(72) Inventor: Grzegorz Aleksander Pilatowicz, Grens (CH)

(73) Assignee: JT International SA, Geneva (CH)

( * ) Notice: Subject to any disclaimer, the term of this patent is extended or adjusted under 35 U.S.C. 154(b) by 1017 days.

(21) Appl. No.: 17/785,293

(22) PCT Filed: Dec. 16, 2020

(86) PCT No.: PCT/EP2020/086500
§ 371 (c)(1),
(2) Date: Jun. 14, 2022

(87) PCT Pub. No.: WO2021/122801
PCT Pub. Date: Jun. 24, 2021

(65) Prior Publication Data
US 2023/0009690 A1　Jan. 12, 2023

(30) Foreign Application Priority Data
Dec. 18, 2019　(EP) ..................................... 19217721

(51) Int. Cl.
*A24F 40/57*　　(2020.01)
*A24F 40/20*　　(2020.01)
(Continued)

(52) U.S. Cl.
CPC .............. *A24F 40/57* (2020.01); *A24F 40/20* (2020.01); *A24F 40/90* (2020.01);
(Continued)

(58) Field of Classification Search
None
See application file for complete search history.

(56) References Cited

U.S. PATENT DOCUMENTS 5,808,447 A * 9/1998 Hagino ............. H02J 7/007182
320/155
9,423,152 B2 * 8/2016 Ampolini .............. F24H 9/0005
(Continued)

FOREIGN PATENT DOCUMENTS

CN　　202774134 U　　3/2013
CN　　103281920 A　　9/2013
(Continued)

OTHER PUBLICATIONS

Search Report dated Mar. 11, 2025 from the Office Action for Chinese Application No. 202080089879.5 issued Mar. 14, 2025. 3 pages.

(Continued)

*Primary Examiner* — Thor S Campbell
(74) *Attorney, Agent, or Firm* — Lerner David LLP

(57) ABSTRACT

An aerosol generation device includes a power system having at least one supercapacitor and at least one battery. The power system is operable in a plurality of selectable operating modes. The aerosol generation device further includes a controller. The controller is configured to control a power flow of the at least one supercapacitor and a power flow of the at least one battery based on the selected operating mode. The plurality of operating modes includes a float mode in which a heater associated with the aerosol generation device is maintained substantially at an aerosol generation temperature. In the float mode the controller is configured to control a power flow of the power system to maintain the heater substantially at the aerosol generation temperature, and control the at least one battery to charge the at least one supercapacitor.

19 Claims, 2 Drawing Sheets

(51) Int. Cl.

| | | |
|---|---|---|
| *A24F 40/90* | (2020.01) |
| *H01M 10/42* | (2006.01) |
| *H01M 10/44* | (2006.01) |
| *H02J 7/00* | (2026.01) |
| *H02J 7/34* | (2006.01) |
| *H02J 7/82* | (2026.01) |
| *H05B 1/02* | (2006.01) |

(52) U.S. Cl.
CPC ....... *H01M 10/4264* (2013.01); *H01M 10/44* (2013.01); *H02J 7/345* (2013.01); *H02J 7/82* (2026.01); *H02J 7/855* (2026.01); *H05B 1/0252* (2013.01); *H01M 2220/30* (2013.01); *H02J 2207/50* (2020.01)

(56) References Cited

U.S. PATENT DOCUMENTS

| | | | | |
|---|---|---|---|---|
| 10,333,339 | B2 * | 6/2019 | Sur | H02J 7/35 |
| 10,918,134 | B2 * | 2/2021 | Sur | H05B 3/0014 |
| 12,022,877 | B2 * | 7/2024 | Ono | A24F 40/50 |
| 2009/0091302 | A1 * | 4/2009 | Rusan | H01G 11/14 |
| | | | | 320/167 |
| 2014/0014125 | A1 | 1/2014 | Fernando et al. | |
| 2014/0209105 | A1 * | 7/2014 | Sears | A24F 40/44 |
| | | | | 131/328 |
| 2014/0270727 | A1 | 9/2014 | Ampolini et al. | |
| 2016/0331030 | A1 * | 11/2016 | Ampolini | A61M 11/042 |
| 2016/0360787 | A1 | 12/2016 | Bailey | |
| 2017/0070039 | A1 | 3/2017 | Fisher | |
| 2017/0112191 | A1 * | 4/2017 | Sur | A24F 40/50 |
| 2017/0294804 | A1 * | 10/2017 | Sur | H02J 7/0034 |
| 2017/0347714 | A1 | 12/2017 | Metz et al. | |
| 2018/0140011 | A1 * | 5/2018 | Sur | H01G 11/56 |
| 2018/0242635 | A1 * | 8/2018 | Otiaba | H01M 10/44 |
| 2020/0154779 | A1 * | 5/2020 | Novak, III | H02J 7/0063 |
| 2020/0233444 | A1 * | 7/2020 | Akao | A24F 40/53 |
| 2020/0305513 | A1 | 10/2020 | Fernando | |

FOREIGN PATENT DOCUMENTS

| | | | | |
|---|---|---|---|---|
| CN | 105208884 A | 12/2015 | | |
| CN | 107846972 A | 3/2018 | | |
| CN | 109314397 A | 2/2019 | | |
| EP | 3007305 A1 * | 4/2016 | | H02J 7/007 |
| EP | 3607985 A1 * | 2/2020 | | A61M 15/06 |
| GB | 2423199 A * | 8/2006 | | H02J 7/345 |
| GB | 2524295 A | 9/2015 | | |
| WO | 2016118005 A1 | 7/2016 | | |
| WO | WO-2017070039 A1 * | 4/2017 | | A61M 11/042 |
| WO | 2018100498 A1 | 6/2018 | | |

OTHER PUBLICATIONS

International Search Report for PCT/EP2020/086500 dated Feb. 22, 2021. 3 pgs.

* cited by examiner

AEROSOL GENERATION DEVICE POWER SYSTEM

CROSS-REFERENCE TO RELATED APPLICATIONS

The present application is a national phase entry under 35 U.S.C. § 371 of International Application No. PCT/EP2020/086500, filed Dec. 16, 2020, published in English, which claims priority to European Application No. 19217721.0 filed Dec. 18, 2019, the disclosures of which are incorporated herein by reference.

FIELD OF INVENTION

The present invention relates to aerosol generation devices, and more specifically power systems for aerosol generation devices.

BACKGROUND

Aerosol generation devices such as electronic cigarettes and other aerosol inhalers or vaporisation devices are becoming increasingly popular consumer products.

Heating devices for vaporisation or aerosolisation are known in the art. Such devices typically include a heating chamber and heater. In operation, an operator inserts the product to be aerosolised or vaporised into the heating chamber. The product is then heated with an electronic heater to vaporise the constituents of the product for the operator to inhale. In some examples, the product is a tobacco product similar to a traditional cigarette. Such devices are sometimes referred to as "heat not burn" devices in that the product is heated to the point of aerosolisation, without being combusted.

Problems faced by known aerosol generation devices include providing sufficiently fast heating and the effective use of energy.

SUMMARY OF INVENTION

According to an aspect, there is provided an aerosol generation device, the aerosol generation device comprising:
   a power system comprising at least one supercapacitor and at least one battery, wherein the power system is operable in a plurality of selectable operating modes; and
   a controller, wherein the controller is configured to control a power flow of the at least one supercapacitor and a power flow of the at least one battery based on the selected operating mode;
wherein the plurality of operating modes comprises a float mode in which a heater associated with the aerosol generation device is maintained substantially at an aerosol generation temperature, and wherein in the float mode the controller is configured to:
   control a power flow of the power system to maintain the heater associated with the aerosol generation device substantially at the aerosol generation temperature; and
   control the at least one battery to charge the at least one supercapacitor.
In this way, the supercapacitor can be charged and ready for a future aerosolisation session preheating mode. This obviates the need for the user to charge the aerosol generation device, to charge the supercapacitor, between uses. As such, the user experience is improved. Furthermore, as the supercapacitor is recharged, the battery may not need to be used for preheating in a subsequent aerosolisation session, thereby avoiding stressing the battery, and contributing to an improved battery lifespan. This also allows for a more effective use of energy in the aerosol generation device. The supercapacitor may be understood as an electrochemical double-layer capacitor, pseudocapacitor or hybrid capacitor. As an alternative to controlling the at least one battery to charge the at least one supercapacitor, the controller may be configured to control the at least one supercapacitor to discharge in the float mode.

Preferably, the plurality of operating modes further comprises a post-session mode, and wherein in the post-session mode the controller is configured to: when the at least one supercapacitor is not substantially charged at an end point of the float mode, control the at least one battery to continue to charge the at least one supercapacitor beyond the end point of the float mode in the post-session mode.

In this way, it is ensured that the supercapacitor has sufficient charge for a subsequent or future preheating mode without the user having to connect the device to an external power source to charge the supercapacitor even if the aerosolisation session was not long enough for the supercapacitor to be sufficiently recharged by the battery during the float mode. As the supercapacitor is recharged, the battery may not need to be used for preheating in a subsequent aerosolisation session, thereby avoiding stressing the battery, and contributing to an improved battery lifespan. This also allows for a more effective use of energy in the aerosol generation device.

Preferably, the plurality of operating modes further comprises a first preheating mode in which the heater associated with the aerosol generation device is heated to a predetermined temperature using the power system, and wherein in the first preheating mode the controller is configured to: control both the at least one supercapacitor and the at least one battery to provide power to the heater.

The use of the supercapacitor in the preheating mode is advantageous as its fast delivery of energy provides very fast preheating of the heater. The combination of the supercapacitor and battery in beneficial as, if the supercapacitor alone does not have enough energy stored or cannot store enough energy provide the required power to heat the heater to the predetermined temperature, the battery can provide the additional power required. The use of the supercapacitor in combination with the battery during the preheating may lower the stress applied to the battery compared to if a battery alone were used for the preheating. Lowering the stress applied to the battery can reduce safety risks associated with a stressed battery and prolong the lifespan of the battery.

Preferably, the plurality of operating modes further comprises a second preheating mode in which the heater associated with the aerosol generation device is heated to a predetermined temperature using the power system, and wherein in the second preheating mode the controller is configured to: control the at least one supercapacitor to provide power to the heater, without the at least one battery providing power to the heater.

In this way, the high capacity of the supercapacitor, and fast delivery of energy, allows for a very fast preheating of the heater. Not using the battery for the preheating mode prevents stress being applied to the battery when preheating the heater, thereby improving the lifespan of the battery. Furthermore, this allows for a greater level of energy to be preserved in the battery for the float mode following the preheating mode.

Preferably, the plurality of operating modes further comprises a first charging mode, and wherein in the first charging mode the controller is configured to: control the at least one supercapacitor to charge, from an external power source connectable to the aerosol generation device, until the at least one supercapacitor is fully charged, then control the at least one battery to charge from the external power source.

In this way, when the supercapacitor is used for preheating the heater, the aerosol generation device will be able to carry out the preheating mode thereby making a subsequent aerosolisation session at least partially possible even if the power system itself is not fully charged as the supercapacitor used for the preheating mode has been preferentially charged. This allows for a more effective use of energy in the aerosol generation device.

Preferably, the plurality of operating modes further comprises a second charging mode, and wherein in the second charging mode the controller is configured to: control the at least one supercapacitor to charge, from an external power source connectable to the aerosol generation device, until the at least one supercapacitor reaches a predetermined charge level, and then control both the at least one supercapacitor and the at least one battery to charge from the external power source.

In this way, a high utilisation of the full available charging power of the external power source is provided. This allows for a more effective use of energy in the aerosol generation device.

Preferably, the predetermined charge level is: greater than 50% of a full charge; or more preferably 60% to 90% of a full charge; or more preferably 70% to 80% of a full charge.

Preferably, the plurality of operating modes further comprises a third charging mode, and wherein in the third charging mode the controller is configured to: control both the at least one supercapacitor and the at least one battery to charge from an external power source connectable to the aerosol generation device.

Preferably, in the third charging mode the controller is configured to: control both the at least one supercapacitor and the at least one battery to charge from an external power source connectable to the aerosol generation device when the external power source has a suitable power capability.

In this way, when the supercapacitor is used for preheating the heater, the power system can be charged without risking the supercapacitor not being suitably charged to preheat the heater in a subsequent aerosolisation session. This allows for a more effective use of energy in the aerosol generation device.

Preferably, the at least one supercapacitor comprises at least one hybrid supercapacitor and/or at least one asymmetric supercapacitor and/or at least one pseudo supercapacitor.

The use of a hybrid supercapacitor, asymmetric supercapacitor or pseudo supercapacitor is advantageous in that they can be have a high enough energy density and power density to provide for the preheating and/or aerosolisation of at least one aerosol generating consumable.

Preferably, the at least one supercapacitor is configured to store enough energy to power the associated heater to aerosolise at least one aerosol generating consumable receivable in the aerosol generation device.

Preferably, the aerosol generation device is arranged to receive an aerosol generating consumable, and wherein the aerosol generating consumable comprises a tobacco rod.

According to an aspect, there is provided a method of controlling a power system of an aerosol generation device, wherein the power system comprises at least one supercapacitor and at least one battery, and the power system is operable in a plurality of selectable operating modes, and the method comprising:

controlling, by a controller, a power flow of the at least one supercapacitor and a power flow of the at least one battery based on the selected operating mode; and wherein the plurality of operating modes comprises a float mode in which a heater associated with the aerosol generation device is maintained substantially at an aerosol generation temperature, and in the float mode the method further comprising:

controlling, by the controller, a power flow of the power system to maintain the heater associated with the aerosol generation device substantially at the aerosol generation temperature; and controlling, by the controller, the at least one battery to charge the at least one supercapacitor.

According to an aspect, there is provided a non-transitory computer-readable medium storing instructions that, when executed by one or more processors, cause the one or more processors to control a power system of an aerosol generation device, wherein the power system comprises at least one supercapacitor and at least one battery, and the power system is operable in a plurality of selectable operating modes;

wherein the instructions cause the one or more processors to:

control a power flow of the at least one supercapacitor and a power flow of the at least one battery based on the selected operating mode; and wherein the plurality of operating modes comprises a float mode in which a heater associated with the aerosol generation device is maintained substantially at an aerosol generation temperature, and in the float mode the instructions further cause the one or more processors to:

control a power flow of the power system to maintain the heater associated with the aerosol generation device substantially at the aerosol generation temperature; and control the at least one battery to charge the at least one supercapacitor.

According to an aspect, there is provided an aerosol generation device, the aerosol generation device comprising:

a power system comprising at least one supercapacitor and at least one battery, wherein the power system is operable in a plurality of selectable operating modes; and a controller, wherein the controller is configured to control a power flow of the at least one supercapacitor and a power flow of the at least one battery based on the selected operating mode; and wherein the plurality of operating modes comprises a preheating mode and/or a charging mode.

Preferably, the plurality of operating modes further comprises a float mode in which a heater associated with the aerosol generation device is maintained substantially at an aerosol generation temperature, and wherein in the float mode the controller is configured to: control a power flow of the power system to maintain the heater associated with the aerosol generation device substantially at the aerosol generation temperature; and control the at least one battery to charge the at least one supercapacitor.

Preferably, the plurality of operating modes further comprises a post-session mode, and wherein in the post-session mode the controller is configured to: when the at least one supercapacitor is not substantially charged at an end point of the float mode, control the at least one battery to continue to charge the at least one supercapacitor beyond the end point of the float mode in the post-session mode.

Preferably, the preheating mode comprises a first preheating mode in which a heater associated with the aerosol generation device is heated to a predetermined temperature using the power system, and wherein in the first preheating mode the controller is configured to: control both the at least one supercapacitor and the at least one battery to provide power to the heater.

Preferably, the preheating mode comprises a second preheating mode in which a heater associated with the aerosol generation device is heated to a predetermined temperature using the power system, and wherein in the second preheating mode the controller is configured to: control the at least one supercapacitor to provide power to the heater, without the at least one battery providing power to the heater.

Preferably, the charging mode comprises a first charging mode, wherein in the first charging mode the controller is configured to: control the at least one supercapacitor to charge, from an external power source connectable to the aerosol generation device, until the at least one supercapacitor is fully charged, then control the at least one battery to charge from the external power source.

Preferably, the charging mode comprises a second charging mode, wherein in the second charging mode the controller is configured to: control the at least one supercapacitor to charge, from an external power source connectable to the aerosol generation device, until the at least one supercapacitor reaches a predetermined charge level, and then control both the at least one supercapacitor and the at least one battery to charge from the external power source.

Preferably, the predetermined charge level is: greater than 50% of a full charge; or more preferably 60% to 90% of a full charge; or more preferably 70% to 80% of a full charge.

Preferably, the charging mode comprises a third charging mode, wherein in the third charging mode the controller is configured to: control both the at least one supercapacitor and the at least one battery to charge from an external power source connectable to the aerosol generation device.

Preferably, in the third charging mode the controller is configured to: control both the at least one supercapacitor and the at least one battery to charge from an external power source connectable to the aerosol generation device when the external power source has a suitable power capability.

Preferably, the at least one supercapacitor comprises at least one hybrid supercapacitor and/or at least one asymmetric supercapacitor and/or at least one pseudo supercapacitor.

Preferably, the at least one supercapacitor is configured to store enough energy to power an associated heater to aerosolise at least one aerosol generating consumable receivable in the aerosol generation device.

Preferably, the aerosol generation device is arranged to receive an aerosol generating consumable, and wherein the aerosol generating consumable comprises a tobacco rod.

According to an aspect there is provided a method of controlling a power system of an aerosol generation device, wherein the power system comprises at least one supercapacitor and at least one battery, and the power system is operable in a plurality of selectable operating modes, wherein the plurality of operating modes comprises a preheating mode and/or a charging mode, and the method comprises:

controlling, by a controller, a power flow of the at least one supercapacitor and a power flow of the at least one battery based on the selected operating mode.

According to an aspect there is provided a non-transitory computer-readable medium storing instructions that, when executed by one or more processors, cause the one or more processors to control a power system of an aerosol generation device, and wherein the power system comprises at least one supercapacitor and at least one battery, and the power system is operable in a plurality of selectable operating modes wherein the plurality of operating modes comprises a preheating mode and/or a charging mode;

wherein the instructions cause the one or more processors to:

control a power flow of the at least one supercapacitor and a power flow of the at least one battery based on the selected operating mode.

According to an aspect, there is provided an aerosol generation device configured to heat a tobacco rod, the aerosol generation device comprising:

a power system comprising at least one supercapacitor and at least one battery, wherein the power system is operable in a plurality of selectable operating modes; and a controller, wherein the controller is configured to control a power flow of the at least one supercapacitor and a power flow of the at least one battery based on the selected operating mode;

wherein, in an aerosolisation session, the operating modes comprise a preheating mode in which a heater associated with the aerosol generation device is heated to a predetermined temperature and a float mode in which the heater associated with the aerosol generation device is maintained substantially at an aerosol generation temperature of the tobacco rod, and the controller is configured to:

control the at least one supercapacitor to provide power to the heater in the preheating mode; and control the at least one battery to charge the at least one supercapacitor in the float mode.

According to an aspect, there is provided a method of controlling a power system of an aerosol generation device configured to heat a tobacco rod, wherein the power system comprises at least one supercapacitor and at least one battery, and the power system is operable in a plurality of selectable operating modes, and the method comprises:

controlling, by a controller, a power flow of the at least one supercapacitor and a power flow of the at least one battery based on the selected operating mode;

wherein, in an aerosolisation session, the operating modes comprise a preheating mode in which a heater associated with the aerosol generation device is heated to a predetermined temperature and a float mode in which the heater associated with the aerosol generation device is maintained substantially at an aerosol generation temperature of the tobacco rod, and the method further comprises:

controlling the at least one supercapacitor to provide power to the heater in the preheating mode; and controlling the at least one battery to charge the at least one supercapacitor in the float mode.

According to an aspect, there is provided a non-transitory computer-readable medium storing instructions that, when executed by one or more processors, cause the one or more processors to control a power system of an aerosol generation device configured to heat a tobacco rod, wherein the power system comprises at least one supercapacitor and at least one battery, and the power system is operable in a plurality of selectable operating modes, wherein the instructions cause the one or more processors to:

control a power flow of the at least one supercapacitor and a power flow of the at least one battery based on the selected operating mode;

wherein, in an aerosolisation session, the operating modes comprise a preheating mode in which a heater associated with the aerosol generation device is heated to a predetermined temperature and a float mode in which the heater associated with the aerosol generation device is maintained substantially at an aerosol generation temperature of the tobacco rod; and the instruction further cause the one or more processors to:

control the at least one supercapacitor to provide power to the heater in the preheating mode; and control the at least one battery to charge the at least one supercapacitor in the float mode.

Any of the preceding preferable features may be included in any of the preceding aspects, as appropriate.

BRIEF DESCRIPTION OF THE DRAWINGS

Embodiments of the invention are now described, by way of example, with reference to the drawings, in which.

DETAILED DESCRIPTION

Figure 1:
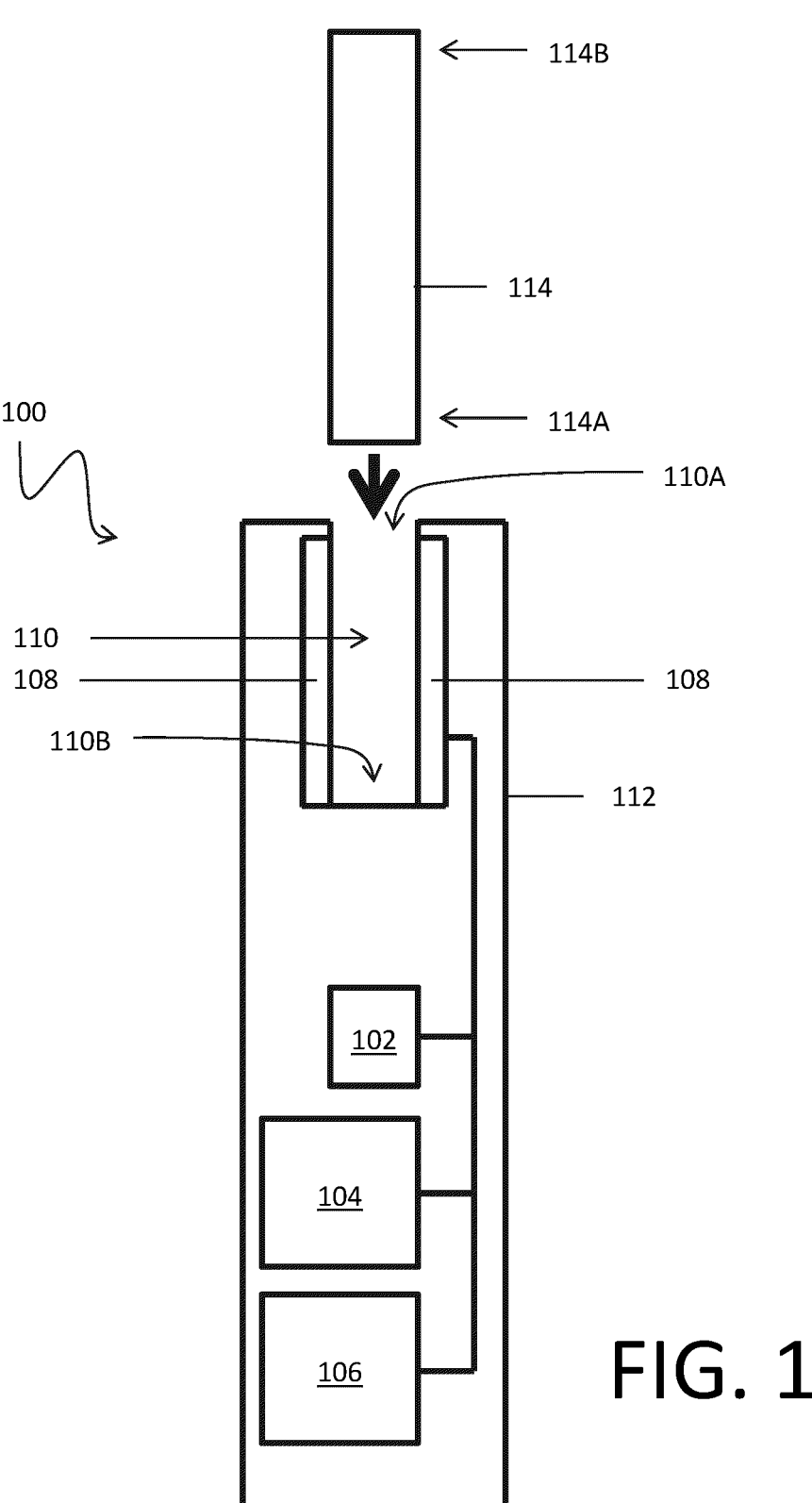
FIG. 1 is a block diagram of an aerosol generation device according to an embodiment of the invention.

FIG. 1 shows a block diagram of the components of an aerosol generation device 100 or a vapor generation device, also known as an electronic cigarette. For the purposes of the present description, it will be understood that the terms vapor and aerosol are interchangeable.

The aerosol generation device 100 has a body portion 112 containing controller 102, and a power system comprising at least one battery 104 and at least one supercapacitor 106. The power system is operable in a plurality of selectable operating modes. Herein only one battery 104 and one supercapacitor 106 are referred to; the skilled person will however understand that the power system can comprise one or more batteries and one or more supercapacitors as appropriate, and that references to "the battery" can encompass "the at least one battery", and "the supercapacitor" can encompass "the at least one supercapacitor". The controller 102 is configured to control a power flow of the supercapacitor 106 and a power flow of the battery 104 based on the selected operating mode, as will be subsequently described.

In an example, a heater 108 is contained with the body portion 112. In such an example, as shown in FIG. 1, the heater 108 is arranged in a cavity 110 or chamber in the body portion 112. The cavity 110 is accessed by an opening 110A in the body portion 112. The cavity 110 is arranged to receive an associated aerosol generating consumable 114. The aerosol generating consumable can contain an aerosol generating material, such as a tobacco rod containing tobacco. A tobacco rod can be similar to a traditional cigarette. The cavity 110 has cross-section approximately equal to that of the aerosol generating consumable 114, and a depth such that when the associated aerosol generating consumable 114 is inserted into the cavity 110, a first end portion 114A of the aerosol generating consumable 114 reaches a bottom portion 110B of the cavity 110 (that is, an end portion 110B of the cavity 110 distal from the cavity opening 110A), and a second end portion 114B of the aerosol generating consumable 114 distal to the first end portion 114A extends outwardly from the cavity 110. In this way, a consumer can inhale upon the aerosol generating consumable 114 when it is inserted into the aerosol generation device 100. In the example of FIG. 1, the heater 108 is arranged in the cavity 110 such that the aerosol generating consumable 114 engages the heater 108 when inserted into the cavity 110. In the example of FIG. 1, the heater 108 is arranged as a tube in the cavity such that when the first end portion 114A of the aerosol generating consumable is inserted into the cavity the heater 108 substantially or completely surrounds the portion of the aerosol generating consumable 114 within the cavity 110. The heater 108 can be a wire, such as a coiled wire heater, or a ceramic heater, or any other suitable type of heater. The heater 108 can comprise multiple heating elements sequentially arranged along the axial length of the cavity that can be independently activated (i.e. powered up) in a sequential order. In an alternative embodiment (not shown), the heater can be arranged as an elongate piercing member (such as in the form of needle, rod or blade) within the cavity; in such an embodiment the heater can be arranged to penetrate the aerosol generating consumable and engage the aerosol generating material when the aerosol generating consumable is inserted into the cavity. In another alternative embodiment (not shown), the heater may be in the form of an induction heater. In such an embodiment, a heating element is provided in the consumable, and the heating element is inductively coupled to the induction heater in the cavity when the consumable is inserted into the cavity. The induction heater then heats the heating element by induction.

The heater 108 is arranged to heat the aerosol generating consumable 114 to a predetermined temperature to produce an aerosol in an aerosolisation session. An aerosolisation session can be considered as when the device is operated to produce an aerosol from the aerosol generating consumable 114. In an example in which the aerosol generating consumable 114 is a tobacco rod, the aerosol generating consumable 114 comprises tobacco. The heater 108 is arranged to heat the tobacco, without burning the tobacco, to generate an aerosol. That is, the heater 108 heats the tobacco at a predetermined temperature below the combustion point of the tobacco such that a tobacco-based aerosol is generated. The skilled person will readily understand that the aerosol generating consumable 114 does not necessarily need to comprise tobacco, and that any other suitable substance for aerosolisation (or vaporisation), particularly by heating without burning the substance, can be used in place of tobacco.

The controller 102 is arranged to control the power flow of the supercapacitor 106 and the power flow of the battery 104 based upon a selected operating mode. The operating modes include a preheating mode, a float mode, a post-session mode, and a charging mode.

Figure 2:
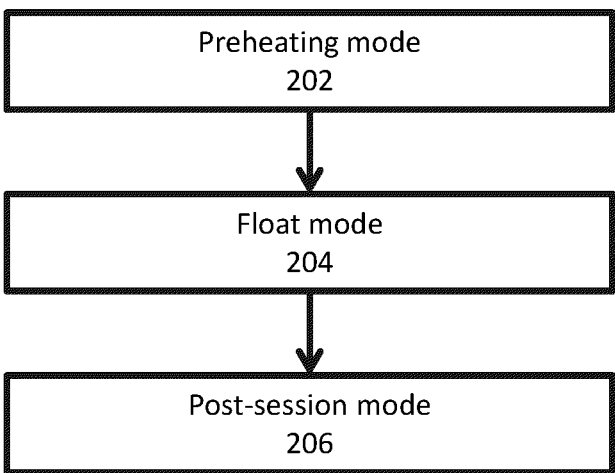
FIG. 2 is a flow diagram of operating modes of an aerosol generation device according to an embodiment of the invention.

The progression from the preheating mode, to the float mode and then to the post-session mode can be understood from FIG. 2. In the preheating mode 202, the heater 108 associated with the aerosol generation device 100 is heated to a predetermined temperature for the generation of an aerosol from the aerosol generating consumable 114. A preheating phase can be considered the time during which the preheating mode is being executed, for example the time it takes for the heater 108 to reach the predetermined temperature. When the heater reaches the predetermined temperature, the controller ends the preheating mode 202 and selects the float mode 204. In the float mode 204 the controller 102 controls the power flow from the power system to maintain the heater 108 substantially at the predetermined temperature so that an aerosol is generated for the consumer to inhale. A float phase can be considered the time during which the float mode is being executed, for example the time during which the heater 108 is aerosolising one (or at least part of one) aerosol generating consumable 114 after the preheating phase. Optionally, following the float mode, a post-session mode 206 is initiated. The post-session mode is described subsequently. A post-session phase can be considered the time during which the post-session mode is being executed.

In the charging mode, the supercapacitor 106 and battery 104 of the power system are charged from an external power source connected to the aerosol generation device 100. The charging mode is described in more detailed subsequently.

The battery 104 can supply power to the heater 108 during the preheating mode in which the heater 108 is heated to a predetermined temperature, and during the float mode in which the heater 108 is held at a constant temperature. In an example, the battery 104 can charge the supercapacitor 106 in the float mode. In an example, the battery 104 is a high energy battery, such as a battery using lithium-ion technology, aluminium-ion technology, or zinc-ion technology, or any other suitable type of battery.

The supercapacitor 106 can supply power to the heater 108 in the preheating mode. In some examples, the supercapacitor 106 can store enough charge to supply power to heater 108 for one or more preheating phases, that is the supercapacitor 106 can store enough energy to supply power to heat the heater 108 to the predetermined temperature one or more times. In some examples the supercapacitor 106 can supply power to the heater 108 in the float mode. In such examples, the supercapacitor 106 can store enough charge to supply the power to the heater 108 to aerosolise one or more tobacco rods in the float mode. In some examples, the supercapacitor 106 can have a total voltage of <5 V and a maximum voltage above 3 V. Preferably, the supercapacitor 106 is more powerful than a battery, but with enough energy storage capacity to provide power to the heater 108 to heat the heater 108 to the predetermined temperature at least once in the preheating mode, and in some examples for the aerosolisation of one aerosol generating consumable 114 in the float mode.

The supercapacitor 106 can be any suitable energy storing unit based on supercapacitor technology. In some examples, the supercapacitor 106 can be a hybrid supercapacitor or an asymmetric or a pseudo supercapacitor.

The controller 102 is configured to control the flow of power of the supercapacitor 106 and the battery 104 based upon the selected operating mode. The controller 102 can be a microcontroller unit comprising memory, with instructions stored thereon for operating the aerosol generation device 100 including instructions for executing the selectable operating modes, and one or processors configured to execute the instructions.

Various operating modes of the aerosol generation device 100 will now be described in more detail.

Preheating Mode

The preheating mode is selected by the controller 102 when an aerosolisation session is initiated by a user of the aerosol generation device 100. This preheating mode can be triggered by the controller determining that a consumer is pressing/has pressed a heating button of the device 100. Alternatively, the preheating mode can be triggered by a gesture controlled activation such as the consumer shaking or tapping the device. In an example, an indicator such as a light emitting diode integrated into the device may be arranged to indicate that the preheating has been completed and the consumer can inhale the generated aerosol.

In the preheating mode, the controller 102 controls the flow of power from the power system to the heater 108 so as to heat the heater 108 to a predetermined temperature or operating temperature. The predetermined temperature can be pre-stored at the controller 102 of the aerosol generation device 100. For example, the predetermined temperature can be a preset, known, temperature at which the aerosol generating material is heated to generate an aerosol. In some examples, the predetermined temperature may be in the range of 210 to 250° C., or more preferably 220 to 240° C., or more preferably 230° C. or approximately 230° C. to provide a desirable user experience. Preheating can be considered as the phase during which the heater 108 temperature is increased to reach the predetermined temperature for the float mode.

In some examples preheating the heater can involve applying up to 30 W from the power system to the heater for 10 s, although it should be understood that these parameters are variable so as to provide a minimal heating time. A supercapacitor can provide very quick preheating due to the associated high power capacity, in particular compared when compared to the use of a battery alone for pre-heating.

In a first example of a preheating mode the heater 108 associated with the aerosol generation device 100 is heated to the predetermined temperature using the power system. More specifically, the controller 102 is configured to control both the supercapacitor 106 and the battery 104 to provide power to the heater 108 during the preheating mode. That is, power is supplied from the combination of the both the supercapacitor 106 and the battery 104 to the heater 108 so as to heat the heater 108 to the predetermined temperature.

The supercapacitor 106 is advantageous as its high capacity and fast delivery of energy provides very fast preheating of the heater 108. The combination of the supercapacitor 106 and battery 104 is beneficial as, if the supercapacitor 106 alone does not have enough energy stored or cannot store enough energy to provide the required power to heat the heater 108 to the predetermined temperature, the battery 104 can provide the additional power required. The use of the supercapacitor 106 in combination with the battery 104 during the preheating lowers the stress applied to the battery 104 compared to if a battery 104 alone were used for the preheating. Lowering the stress applied to the battery 104 can reduce safety risks associated with a stressed battery 104 and prolong the life of the battery 104.

In a second example of a preheating mode the heater 108 associated with the aerosol generation device 100 is heated to the predetermined temperature using the power system. More specifically, the controller 102 is configured to control the supercapacitor 106 to provide power to the heater 108 without the battery 104 also providing power to the heater 108 during the preheating mode. That is, the controller 102 controls only the supercapacitor 106 to provide power to the heater 108 during the preheating mode, and the battery 104 is not used to supply power to the heater 108 during the preheating mode. This is advantageous as the high capacity of the supercapacitor 106, and fast delivery of energy, allows for a very fast preheating of the heater 108. Not using the battery 104 for the preheating mode prevents stress being applied to the battery 104 when preheating the heater 108, thereby improving the lifespan of the battery 104. Furthermore, this allows for a greater level of energy to be preserved in the battery 104 for the float mode following the preheating mode.

The controller 102 can store operating instructions for one or more of the aforementioned example preheating modes, and execute the various preheating modes as required, for example depending on specific hardware considerations associated with the aerosol generation device 100.

When the heater 108 has reached the predetermined temperature the preheating mode ends and the float mode is initiated.

Float Mode

The float mode is selected by the controller 102 when the controller 102 determines that the preheating mode has successfully heated the heater 108 to the predetermined temperature.

In the float mode the heater 108 associated with the aerosol generation device 100 is maintained substantially at an aerosol generation temperature (which may be the predetermined or operating temperature) using the power system. That is, information relating to the temperature of the heater 108 is fed back to the controller 102; when the heater temperature is below the predetermined aerosol generation temperature the controller 102 increases the power applied to the heater 108 to increase the temperature; when the heater temperature is above the predetermined aerosol generation temperature the controller 102 reduces the power applied to the heater 108 to lower the temperature. The controller 102 controls the power flow from the power system to maintain the heater substantially at the aerosol generation temperature.

During the float mode, the controller 102 also controls the battery 104 to charge the supercapacitor 106. That is, the battery 104 is controlled to both directly supply power to the heater 108 to maintain the predetermined temperature whilst also supplying power to the supercapacitor 106 to charge the supercapacitor 106. In such an example of a float mode, the controller 102 may control only the battery 104 to supply power to the heater 108, without the supercapacitor 106 supplying power to the heater 108. This is advantageous as it allows for the supercapacitor 106 to be charged ready for a future aerosolisation session when it may be required to execute another preheating mode.

In another example of a float mode, the supercapacitor 106 alone may provide power to the heater 108. For example the supercapacitor 106 may be configured to store enough energy to be able to supply power to the heater 108 to aerosolise one or more aerosol generating consumables 114 in a float mode.

In further examples of a float mode a combination of the battery 104 and the supercapacitor 106 may be used together at the beginning of the float mode. When the power level of the supercapacitor 106 drops to a certain point only the battery 104 may provide power to the heater 108 whilst also providing power to charge the supercapacitor 106.

The float mode ends when the controller 102 determines that the aerosolisation session has ended. For example, the controller 102 can determine that the aerosolisation session has ended when the consumer releases the heater 108 button, when an airflow has not been detected for a predetermined period of time, or when a predetermined aerosolisation session timer expires. The aerosolisation session may end when the consumer has fully aerosolised an aerosol generating consumable 114, or has aerosolised a desired amount of an aerosol generating consumable 114.

Post-Session Mode

Optionally, when the controller 102 determines that the float mode has ended, the controller 102 can select to initiate the post-session mode, which is a mode which is initiated following the aerosolisation session.

The post-session mode is initiated following the float mode when the supercapacitor 106 has not been suitably or fully recharged by the battery 104 during the float mode.

In the post-session mode the controller 102 is configured to control the battery 104 to continue to charge the supercapacitor 106 beyond the end-point of the float mode when the supercapacitor 106 is not fully charged (or suitably charged) at the end of the float mode.

When the consumer finishes their aerosolisation session the battery 104 may not yet have provided enough charge to the supercapacitor 106 during the float mode for the supercapacitor 106 to be fully (or substantially) recharged. That is the supercapacitor 106 may not be sufficiently charged to execute a subsequent preheating mode. In this case, the controller 102 determines that the supercapacitor 106 is not fully charged (or sufficiently charged for the execution of a subsequent preheating mode), and then controls the battery 104 to continue charging the supercapacitor 106 beyond the end-point of the float mode, i.e. after the aerosolisation session or float mode has finished, until the supercapacitor is fully (or substantially) recharged for a subsequent preheating mode.

This is advantageous as it ensures that the supercapacitor 106 has sufficient energy stored for a subsequent or future preheating mode without the user having to connect the device to an external power source to charge the supercapacitor 106 even if the aerosolisation session was not long enough for the supercapacitor 106 to be sufficiently recharged by the battery 104 during the float mode. That is, if the consumer only carries out a short aerosolisation session, the supercapacitor 106 can still be recharged for the preheating mode of the next aerosolisation session. In addition to this improvement to the user experience, this also mitigates the need to instead or additionally use the battery 104 to power the heater 108 in a subsequent preheating mode as the supercapacitor 106 will have enough energy stored to perform this. This mitigates stressing the battery 104 during a subsequent preheating mode and therefore avoids potentially shortening the lifespan of the battery 104.

Charging Mode

The charging mode is selected when the controller 102 determines that the aerosol generation device 100 has been connected to an external power source.

In an example, the external power source can be a power supply, such as a mains power supply or power bank, connected to the aerosol generation device 100 by way of a wired connection to the aerosol generation device 100. In an example, the wired or wireless connection can be in the form of a USB cable connected to the aerosol generation device 100 by way of a USB socket in the aerosol generation device 100. In particular, the USB connection may be a micro-USB connection or a USB-C connection. The skilled person will, however, readily understand that any other suitable type of wired or wireless power connection can be used. The charging mode can be initiated by the controller 102 determining that the external power source has been connected to the aerosol generation device 100.

In a first example of a charging mode the controller 102 is configured to control the supercapacitor 106 to charge, from the external power source connectable to the aerosol generation device 100, until the supercapacitor 106 is fully charged and then the controller 102 controls the battery 104 to charge from the external power source. Only the supercapacitor 106 is charged, and then only the battery 104 is charged. That is, the supercapacitor 106 is given a higher charging priority than the battery 104 in that it is charged before the battery 104 is charged. In this way, the aerosol generation device 100 will be able to carry out the preheating mode thereby making a subsequent aerosolisation session at least partially possible even if the power system itself is not fully charged as the supercapacitor 106 used for the preheating mode has been preferentially charged.

In a second example of a charging mode the controller 102 is configured to control the supercapacitor 106 to charge, from the external power source connectable to the aerosol generation device 100, until the supercapacitor 106 reaches a predetermined charge level, and then the controller 102 is configured to control both the supercapacitor 106 and the battery 104 to charge from the external power source. Only the supercapacitor 106 is charged until it reaches the predetermined charge level, and then both the battery 104 and the supercapacitor 106 are charged. That is, the controller 102 determines the charge level of the supercapacitor 106 and controls only the supercapacitor 106 to charge until it reaches a point at which it is approaching full charge, for example by comparing the charge level to the predetermined charge level (i.e. a predetermined charge threshold) stored at the controller 102. When the controller 102 determines that the supercapacitor 106 has been charged to the predetermined charge threshold it controls both the supercapacitor 106 and the battery 104 to charge from the external power source. The supercapacitor 106 can be considered to have a higher charging priority than the battery 104 until the supercapacitor 106 reaches the predetermined charge threshold. This approach provides a high utilisation of the full available charging power of the external power source.

In some examples, the predetermined charge level can be a charge level greater than 50% of a full charge, or preferably a charge level in the range of 60-90% of a full charge, or more preferably a charge level in the range of 70-80% of a full charge.

In a third example of a charging mode the controller 102 is configured to control both the supercapacitor 106 and the battery 104 to charge from the external power source connectable to the aerosol generation device 100. More particularly, the controller 102 controls both the supercapacitor 106 and the battery 104 to charge from the external power source when the external power source has a suitable power capability. That is, when the external power source is capable of delivering power at a high enough level, both the battery 104 and the supercapacitor 106 are charged at the same time (i.e. the battery 104 and supercapacitor 106 are given equal charging priorities). Whether the external power source has a suitable power capability can be determined by the controller 102 when the aerosol generation device 100 is connected to the external power source; the controller 102 can compare the power capability, or power delivery level, of the external power source to a predetermined power delivery threshold stored at the controller 102. When the power delivery level of the external power source meets or exceeds the predetermined power delivery threshold, the controller 102 controls both the battery 104 and supercapacitor 106 to be charged at the same time. This charging mode is advantageous as it provides for the power system to charge without risking the supercapacitor 106 not being suitably charged to perform the preheating mode for a subsequent aerosolisation session.

Without the supercapacitor 106 being suitably charged it may not be possible to carry out a subsequent aerosolisation session as the preheating mode may not be able to be performed; the aforementioned charging modes for the power system obviate this issue by ensuring that the supercapacitor 106 is suitably charged.

The controller 102 can store one or more of the aforementioned charging modes and execute the various charging modes as required, for example based on specific hardware considerations associated with the aerosol generation device 100 and/or the external power source. The aforementioned charging modes are advantageous in that they provide a fast charging after a full discharge of the power system, for the use with one or more aerosol generating consumables in subsequent aerosolisation sessions. This decreases the waiting time for an aerosolisation session. These fast charging examples can allow for the power system to be quickly charged to a state in which enough energy is stored to aerosolise a plurality (for example two) aerosol generating consumables.

The skilled person will readily understand that the controller 102 can be configured to execute any of the aforementioned operating modes in combination with one another as appropriate.

The processing steps described herein carried out by the controller 102 may be stored in a non-transitory computer-readable medium, or storage, associated with the main control unit. A computer-readable medium can include non-volatile media and volatile media. Volatile media can include semiconductor memories and dynamic memories, amongst others. Non-volatile media can include optical disks and magnetic disks, amongst others.

It will be readily understood to the skilled person that the preceding embodiments in the foregoing description are not limiting; features of each embodiment may be incorporated into the other embodiments as appropriate.

The invention claimed is:

1. An aerosol generation device comprising:
a power system comprising at least one supercapacitor and at least one battery, wherein the power system is operable in a plurality of selectable operating modes; and
a controller, wherein the controller is configured to control a power flow of the at least one supercapacitor and a power flow of the at least one battery based on a selected one of the plurality of selectable operating modes;
wherein the plurality of selectable operating modes comprises a float mode in which a heater associated with the aerosol generation device is maintained substantially at an aerosol generation temperature, and wherein in the float mode the controller is configured to:
selectively control a rate of the power flow of the at least one battery to maintain the heater associated with the aerosol generation device substantially at the aerosol generation temperature; and
selectively control the at least one battery to charge the at least one supercapacitor.

2. The aerosol generation device of claim 1, wherein the plurality of selectable operating modes further comprises a post-session mode, and wherein in the post-session mode the controller is configured to:
when the at least one supercapacitor is not substantially charged at an end point of the float mode, control the at least one battery to continue to charge the at least one supercapacitor beyond the end point of the float mode in the post-session mode.

3. The aerosol generation device of claim 1, wherein the plurality of selectable operating modes further comprises a first preheating mode in which the heater associated with the aerosol generation device is heated to a predetermined temperature using the power system, and wherein in the first preheating mode the controller is configured to:

control both the at least one supercapacitor and the at least one battery to provide power to the heater.

4. The aerosol generation device of claim 3, wherein the plurality of selectable operating modes further comprises a second preheating mode in which the heater associated with the aerosol generation device is heated to a predetermined temperature using the power system, and wherein in the second preheating mode the controller is configured to:

control the at least one supercapacitor to provide power to the heater, without the at least one battery providing power to the heater.

5. The aerosol generation device of claim 1, wherein the plurality of selectable operating modes further comprises a first charging mode, and wherein in the first charging mode the controller is configured to:

control the at least one supercapacitor to charge, from an external power source connectable to the aerosol generation device, until the at least one supercapacitor is fully charged, then control the at least one battery to charge from the external power source.

6. The aerosol generation device of claim 5, wherein the plurality of selectable operating modes further comprises a second charging mode, and wherein in the second charging mode the controller is configured to:

control the at least one supercapacitor to charge, from an external power source connectable to the aerosol generation device, until the at least one supercapacitor reaches a predetermined charge level, and then control both the at least one supercapacitor and the at least one battery to charge from the external power source.

7. The aerosol generation device of claim 6, wherein the predetermined charge level is:

greater than 50% of a full charge.

8. The aerosol generation device of claim 6, wherein the plurality of selectable operating modes further comprises a third charging mode, and wherein in the third charging mode the controller is configured to:

control both the at least one supercapacitor and the at least one battery to charge from an external power source connectable to the aerosol generation device.

9. The aerosol generation device of claim 8, wherein in the third charging mode the controller is configured to:

control both the at least one supercapacitor and the at least one battery to charge from an external power source connectable to the aerosol generation device when the external power source has a suitable power capability.

10. The aerosol generation device of claim 1, wherein the at least one supercapacitor comprises at least one hybrid supercapacitor and/or at least one asymmetric supercapacitor and/or at least one pseudo supercapacitor.

11. The aerosol generation device of claim 1, wherein the at least one supercapacitor is configured to store enough energy to power the associated heater to aerosolise at least one aerosol generating consumable receivable in the aerosol generation device.

12. The aerosol generation device of claim 1, wherein the aerosol generation device is arranged to receive an aerosol generating consumable comprising a tobacco rod.

13. The aerosol generation device of claim 1, wherein when in the float mode, the controller is further configured to selectively control the at least one supercapacitor to prevent the power flow of the at least one supercapacitor to the heater.

14. The aerosol generation device of claim 1, wherein the float mode corresponds to a duration of time during which the heater is aerosolising at least part of one aerosol generating consumable after a preheating phase.

15. The aerosol generation device of claim 14, wherein the preheating phase corresponds to a phase during which a temperature of the heater is increased to the aerosol generation temperature for the float mode.

16. The aerosol generation device of claim 1, wherein when in the float mode, the controller is further configured to:

receive temperature information associated with an operating temperature of the heater; and increase the power flow of the at least one battery when the operating temperature of the heater is below the aerosol generation temperature, or decrease the power flow of the at least one battery when the operating temperature of the heater is above the aerosol generation temperature.

17. The aerosol generation device of claim 1, wherein when in the float mode, the controller is further configured to:

determine an aerosolization session has ended; and end the float mode.

18. A method of controlling a power system of an aerosol generation device, wherein the power system comprises at least one supercapacitor and at least one battery, and the power system is operable in a plurality of selectable operating modes, the method comprising:

controlling, by a controller, a power flow of the at least one supercapacitor and a power flow of the at least one battery based on a selected one of the plurality of selectable operating modes; and wherein the plurality of selectable operating modes comprises a float mode in which a heater associated with the aerosol generation device is maintained substantially at an aerosol generation temperature, and in the float mode the method further comprising:

selectively controlling, by the controller, a rate of the power flow of the at least one battery to maintain the heater associated with the aerosol generation device substantially at the aerosol generation temperature; and selectively controlling, by the controller, the at least one battery to charge the at least one supercapacitor.

19. A non-transitory computer-readable medium storing instructions that, when executed by one or more processors, cause the one or more processors to control a power system of an aerosol generation device, wherein the power system comprises at least one supercapacitor and at least one battery, and the power system is operable in a plurality of selectable operating modes;

wherein the instructions cause the one or more processors to:

control a power flow of the at least one supercapacitor and a power flow of the at least one battery based on a selected one of the plurality of selectable operating modes; and wherein the plurality of selectable operating modes comprises a float mode in which a heater associated with the aerosol generation device is maintained substantially at an aerosol generation temperature, and in the float mode the instructions further cause the one or more processors to:

selectively control a rate of the power flow of the at least one battery to maintain the heater associated with the aerosol generation device substantially at the aerosol generation temperature; and selectively control the at least one battery to charge the at least one supercapacitor.

* * * * *